United States Patent
Sornique et al.

(10) Patent No.: US 11,029,323 B2
(45) Date of Patent: Jun. 8, 2021

(54) SAILING SHIP COMPRISING AN AERODYNAMIC PROFILE AND A SYSTEM FOR DETERMINING CHARACTERISTICS OF AN AIRFLOW INCIDENT ON A LEADING EDGE OF THE AERODYNAMIC PROFILE

(71) Applicant: Airbus Operations SAS, Toulouse (FR)

(72) Inventors: Olivier Sornique, Lias (FR); Gilles Studer, Fonsorbes (FR); Thierry Renard, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 233 days.

(21) Appl. No.: 16/202,741

(22) Filed: Nov. 28, 2018

(65) Prior Publication Data

US 2019/0163187 A1 May 30, 2019

(30) Foreign Application Priority Data

Nov. 30, 2017 (FR) ...................................... 1761483

(51) Int. Cl.
*B63J 99/00* (2009.01)
*G01P 5/00* (2006.01)
(Continued)

(52) U.S. Cl.
CPC ................ *G01P 5/001* (2013.01); *B63H 9/04* (2013.01); *B63H 9/061* (2020.02); *B63J 99/00* (2013.01);
(Continued)

(58) Field of Classification Search
CPC ........ G05D 1/0206; B63H 9/061; B63H 9/04; G01P 5/001; G01P 5/14; G01M 9/065;
(Continued)

(56) References Cited

U.S. PATENT DOCUMENTS

| | | |
|---|---|---|
| 5,218,863 A | 6/1993 | Mangalam |
| 2011/0246097 A1 | 10/2011 | Mangalam |

(Continued)

FOREIGN PATENT DOCUMENTS

| | | |
|---|---|---|
| EP | 2409912 A1 | 1/2012 |
| EP | 2950071 A1 | 12/2015 |

(Continued)

OTHER PUBLICATIONS

French Search Report; priority document.

*Primary Examiner* — Genna M Mott
(74) *Attorney, Agent, or Firm* — Greer, Burns & Crain, Ltd.

(57) ABSTRACT

In order to be able to determine with precision the location of the stagnation point at different zones along the leading edge of an aerodynamic profile, a system comprises rows of pressure sensors distributed on either side of the leading edge and forming, virtually, patterns that are spaced apart from one another in the form of simple polygonal lines, and a computer connected to the pressure sensors. The computer determines, along each of the patterns, a respective stagnation point position that is defined by a curved abscissa for which a pressure interpolated on the basis of pressure measurements provided by the pressure sensors of the corresponding row is at a maximum, and by an altitude evaluated on the basis of respective altitude data from the pressure sensors of the corresponding row.

8 Claims, 5 Drawing Sheets

(51) Int. Cl.
    *G01P 5/14*     (2006.01)
    *G01M 9/06*     (2006.01)
    *B63H 9/061*     (2020.01)
    *B63H 9/04*     (2020.01)
    *G05D 1/02*     (2020.01)

(52) U.S. Cl.
    CPC .............. *G01M 9/065* (2013.01); *G01P 5/14* (2013.01); *G05D 1/0206* (2013.01)

(58) Field of Classification Search
    CPC ...... B63J 99/00; B63B 79/00; G06F 17/5095; G06F 2217/78
    See application file for complete search history.

(56) References Cited

U.S. PATENT DOCUMENTS

| | | |
|---|---|---|
| 2012/0132117 A1 | 5/2012 | Bermudez Miguel et al. |
| 2016/0313150 A1 | 10/2016 | Dupe et al. |
| 2017/0074750 A1 | 3/2017 | Vialatte et al. |
| 2017/0079152 A1 | 3/2017 | Dupe et al. |

FOREIGN PATENT DOCUMENTS

| | | | | |
|---|---|---|---|---|
| EP | 3144684 A1 | 3/2017 | | |
| JP | 02262494 A | * 10/1990 | | |
| WO | 9415832 A1 | 7/1994 | | |
| WO | WO-2013150368 A1 | * 10/2013 | ............. | G01C 21/16 |
| WO | 2015091994 A1 | 6/2015 | | |
| WO | 2015091996 A1 | 6/2015 | | |

* cited by examiner

SAILING SHIP COMPRISING AN AERODYNAMIC PROFILE AND A SYSTEM FOR DETERMINING CHARACTERISTICS OF AN AIRFLOW INCIDENT ON A LEADING EDGE OF THE AERODYNAMIC PROFILE

CROSS-REFERENCES TO RELATED APPLICATIONS

This application claims the benefit of the French patent application No. 1761483 filed on Nov. 30, 2017, the entire disclosures of which are incorporated herein by way of reference.

TECHNICAL FIELD

The present invention relates to a sailing ship comprising an aerodynamic profile and to a system for determining characteristics of an airflow incident on a leading edge of the aerodynamic profile.

BACKGROUND OF THE INVENTION

The determination of speed and orientation characteristics of an airflow incident on the leading edge of a sail of a sailing ship is conventionally based on the use of wind indicators and anemometers, and on the use of meteorological data.

These instruments and data deliver only overarching information, and, in particular, do not allow the direction and speed of the airflow at various points on the leading edge to be known.

Such information would however be useful, on the one hand, for detailed a posteriori analysis of the performance and behavior of the sail, and, on the other hand, in order to allow the precision of automatic or assisted piloting devices to be improved.

SUMMARY OF THE INVENTION

An aim of the invention is especially to provide a simple, economical and effective solution to this problem.

To this end the invention proposes a sailing ship comprising an aerodynamic profile forming a sail of the sailing ship, and a system for determining characteristics of an airflow incident on a leading edge of the aerodynamic profile, the system comprising:

a series of pressure sensors, which pressure sensors are arranged on a surface of the aerodynamic profile, the pressure sensors of each series being distributed on either side of the leading edge of the aerodynamic profile, the series of pressure sensors virtually forming respective patterns that are spaced apart from one another, each of the patterns being a simple polygonal line; and a computer connected to the pressure sensors so as to receive local pressure values respectively originating from the pressure sensors.

The computer is configured to determine, along each of the patterns, a respective stagnation-point position defined by a curvilinear abscissa defined along the pattern in question and for which a pressure $P^*$ interpolated from pressure measurements delivered by the pressure sensors of the corresponding series is maximal along the pattern in question, and by an altitude evaluated from respective altitude data of the pressure sensors of the corresponding series.

The respective altitude data of the pressure sensors are determined from respective altitudes of the pressure sensors in a frame of reference that is fixed with respect to the sailing ship, and from a variable component determined, for each of the pressure sensors, from measurements of the orientation of the ship.

The system allows the position of the stagnation point in various zones along the leading edge of the aerodynamic profile to be precisely determined.

Knowledge of the position of the stagnation point is particularly advantageous in that it may allow the modulus of the speed of the incident flow and its direction at various points along the leading edge to be determined, as will become more clearly apparent below.

In preferred embodiments of the invention, the patterns lie in respective pattern planes that are distinct from one another and such that each of the pattern planes is orthogonal to the osculating plane at the point of intersection of the leading edge and of the pattern plane in question.

Preferably, the pattern planes are parallel to one another.

In preferred embodiments of the invention, the system furthermore comprises a memory containing a map relating the stagnation-point positions respectively determined along each of the patterns and operational parameters of the aerodynamic profile to a direction profile of the airflow.

In preferred embodiments of the invention, the computer is furthermore configured to determine, along each of the patterns, a respective stagnation pressure, defined as the value of the pressure $P^*$ at the corresponding stagnation-point position.

Preferably, the system furthermore comprises a reference-pressure sensor placed in a sheltered zone away from the aerodynamic profile and connected to the computer, and the computer is furthermore configured to determine a speed profile of the airflow from a reference pressure delivered by the reference-pressure sensor and from the stagnation pressures respectively determined along each of the patterns.

As a variant, the system furthermore comprises an anemometer connected to the computer, and the computer is furthermore configured to determine a speed profile of the airflow by equating an airflow speed value delivered by the anemometer to a speed value of the airflow incident on one of the patterns, and from the stagnation pressures respectively determined along each of the patterns.

In preferred embodiments of the invention, the sailing ship comprises an automatic or assisted piloting device configured to control at least one operational parameter of the aerodynamic profile on the basis of the stagnation-point positions respectively determined along each of the patterns.

BRIEF DESCRIPTION OF THE DRAWINGS

The invention will be better understood and other details, advantages and features thereof will become apparent on reading the following description, which is given by way of non-limiting example with reference to the appended drawings, in which.

DETAILED DESCRIPTION OF THE PREFERRED EMBODIMENTS

The invention generally relates to a sailing ship or yacht 10 comprising an aerodynamic profile 12 forming a sail of the sailing ship and to a system for determining characteristics of an airflow incident on a leading edge of the aerodynamic profile.

Figure 1:
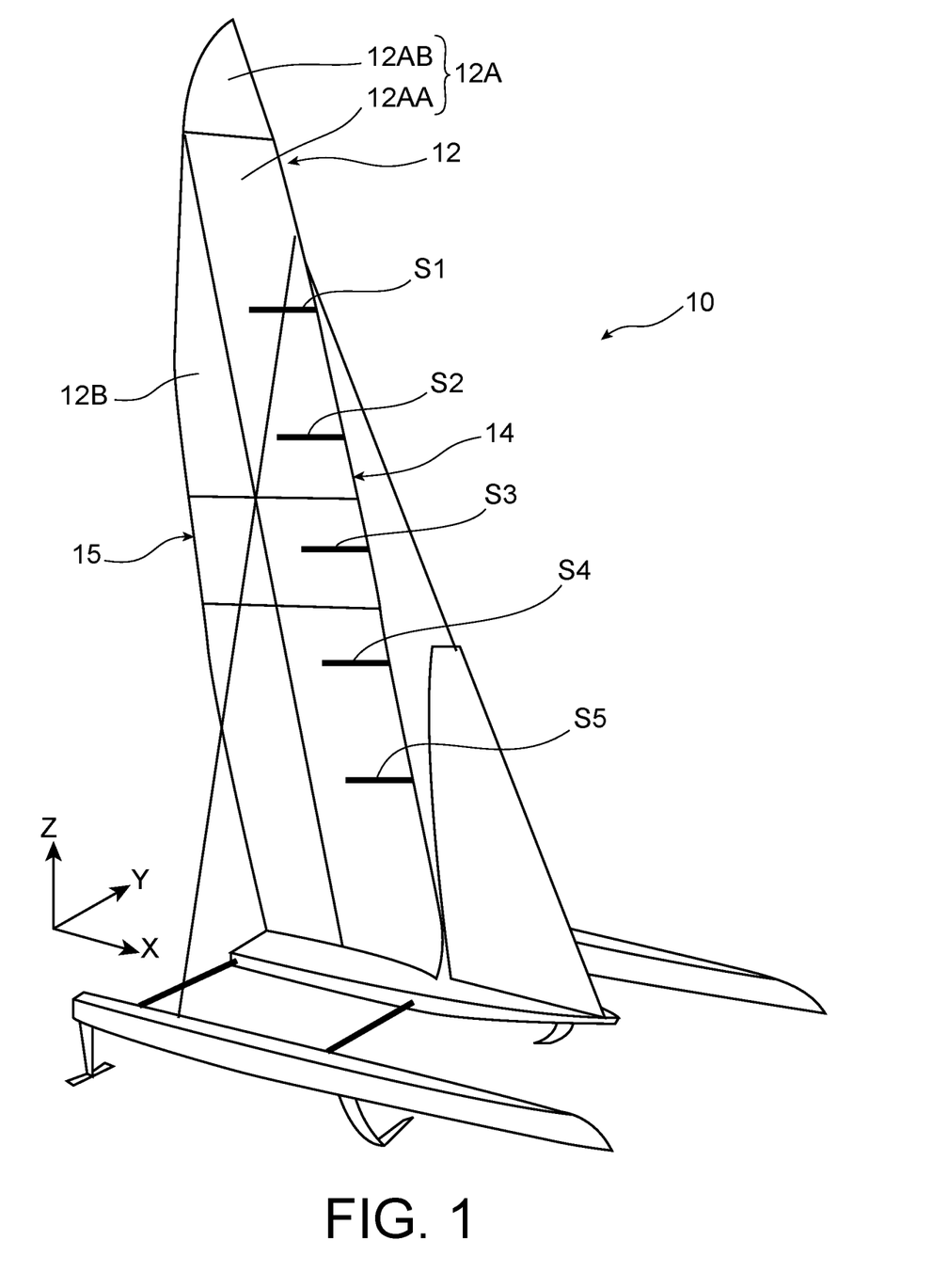
FIG. 1 is a schematic perspective view of a sailing ship according to one preferred embodiment of the invention, in the present case a sailing yacht, comprising an aerodynamic profile and a system for determining characteristics of an airflow incident on a leading edge of the aerodynamic profile.

The described example more particularly relates to a sailing yacht with a rigid sail (sometimes referred to as a "rigid wing"). The rigid sail typically replaces the mainsail of a conventional sailing yacht, and is in general composed of a front element 12A forming the leading edge 14 of the profile, and of a rear element 12B, called the "flap," forming the trailing edge 15 of the profile and making an adjustable angle θ with respect to the front element 12A, which angle is sometimes called the camber angle (shown in FIG. 3). The front element 12A in general comprises a structural front portion, which plays the role of mast insofar as it is via this front portion that the sail is rotatably mounted on the yacht. The front element 12A in general includes a bottom panel 12AA and a top panel 12AB (FIG. 1) that make therebetween an adjustable angle, called the twist angle.

In the sailing yacht of the present description, the longitudinal direction X is defined as the general direction of advance of the sailing yacht or even as the direction extending from the stern to the bow, the transverse direction Y is the direction orthogonal to the longitudinal direction X, i.e., the direction extending from starboard to port, and the vertical direction Z is the direction orthogonal to the directions X and Y.

The system intended to determine characteristics of the incident airflow comprises pressure sensors 16 (FIG. 2) that are arranged on the surface of the aerodynamic profile. These sensors form, generally, series S1-S5 (FIG. 2), which are, for example, five in number and which are defined, physically or not, such that the sensors of each series are distributed on either side of the leading edge 14 of the aerodynamic profile 12, and such that the sensors of each series form virtually respective patterns M1-M5 that are spaced apart from one another. Each of the patterns M1-M5 is defined by virtually connecting pairwise the sensors of a given series so as to form a simple polygonal line, i.e., a geometric figure that is formed by a sequence of straight-line segments connecting a sequence of points corresponding to the sensors, in which figure the intersection of two distinct segments belonging to the polygonal line is either empty, or reduced to their common apex in the case of two successive segments. The fact that the patterns are spaced apart from one another in particular implies that the patterns do not intersect one another.

Figure 2:
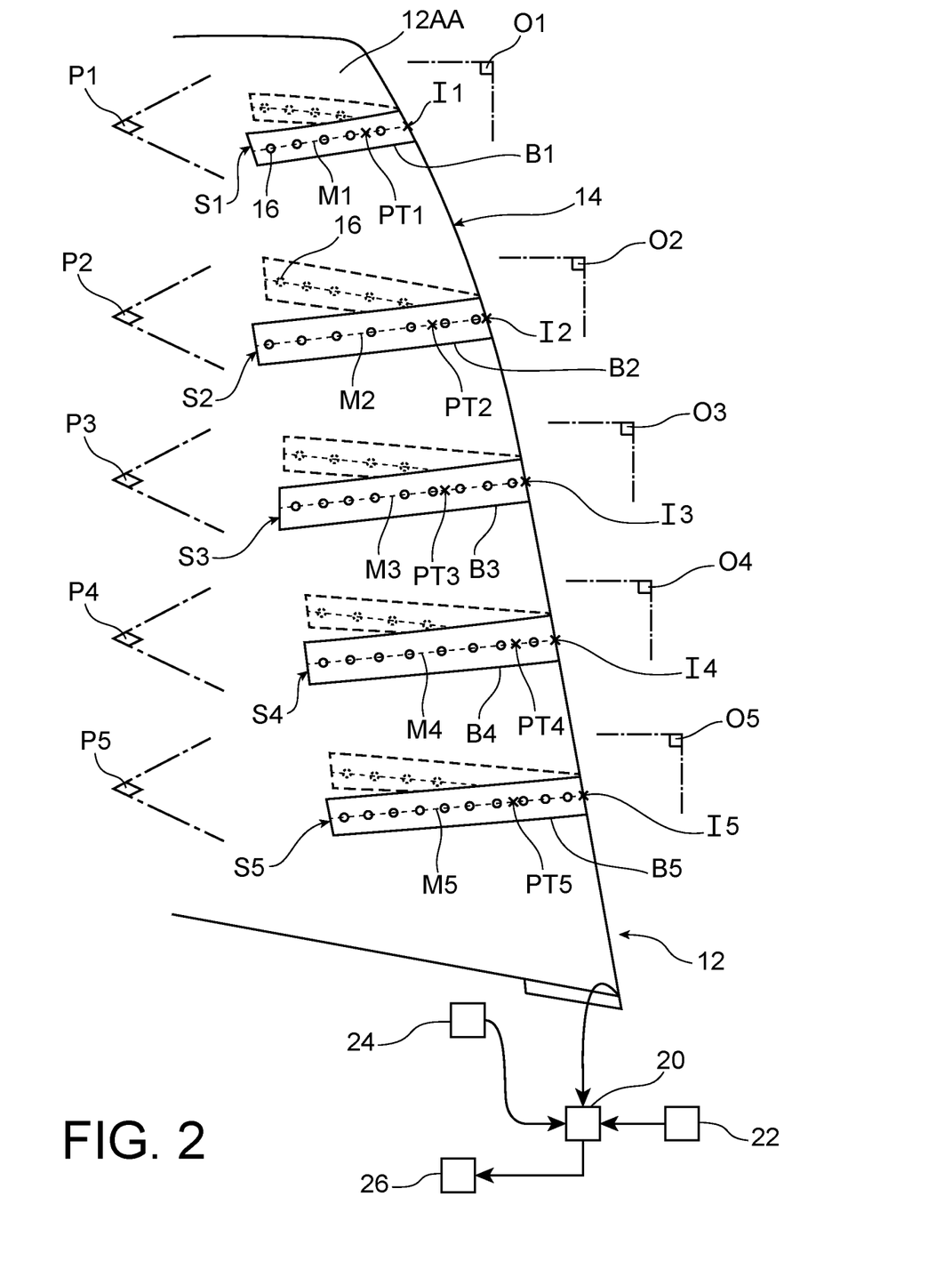
FIG. 2 is a view similar to FIG. 1 and at larger scale of the sailing yacht of FIG. 1, illustrating a front portion of a rigid sail of this sailing yacht.

The series S1-S5 of pressure sensors are thus distributed along the leading edge 14.

In preferred embodiments of the invention, the series S1-S5 of pressure sensors are arranged so that the patterns M1-M5 lie in respective pattern planes P1-P5 that are distinct from one another and such that each of the pattern planes is orthogonal to the osculating plane O1-O5 at the point of intersection I1-I5 of the leading edge 14 and of the pattern plane in question (FIG. 2).

Furthermore, the series S1-S5 of pressure sensors are advantageously arranged so that the pattern planes P1-P5 are locally orthogonal to the leading edge 14.

Generally, the arrangement of the pressure sensors is preferably designed to minimize the angle between each pattern plane and an airflow that is standard or average for the type of envisioned application.

In practice, the series S1-S5 of pressure sensors are thus preferably arranged so that the pattern planes P1-P5 are substantially parallel to the incident wind. In proximity to sea level, the wind generally blows substantially parallel to the horizontal direction. Therefore, the pattern planes P1-P5 are advantageously substantially horizontal, when the yacht adopts an orientation devoid of list and pitch.

Moreover, within each series S1-S5, the sensors 16 are preferably equidistant pairwise along the corresponding pattern M1-M5.

In preferred embodiments of the invention, the series of pressure sensors S1-S5 are physically defined. In particular, the series of sensors are preferably strips B1-B5 that are fastened to the surface of the aerodynamic profile 12. Documents WO2015091994A1, WO2015091996A1, and EP3144684A1 describe an example of a strip of MEMS (microelectromechanical systems) sensors that could be used in the context of the present invention. Such a strip of sensors, in particular, makes it possible to obtain a high density of sensors, able to achieve a high spatial sampling rate. The MEMS sensors may be clocked internally at high speeds, for example at a frequency of 64 Hz, and are thus capable of delivering data in real-time at a rate suitable for the processing operations carried out downstream on the data, for example at a frequency of 16 Hz.

The pressure sensors 16 are configured to measure the static pressure of the laminar airflow moving past the aerodynamic profile. To this end, these sensors 16 have respective sensing surfaces that are locally parallel to the surface of the aerodynamic profile 12, and that are therefore locally parallel to the airflow in the immediate vicinity of the aerodynamic profile.

The system furthermore comprises a computer 20 connected to the pressure sensors 16 so as to receive local pressure values respectively originating from these pressure sensors.

The computer is configured to determine, along each of the patterns M1-M5, a respective stagnation-point position, defined by a pair of coordinates $(a_i, z_i)$ comprising a curvilinear abscissa a1-a5 defined along the pattern M1-M5 in question, and an altitude z1-z5.

The curvilinear abscissa a1-a5 is determined so as to define a point, on the pattern in question, for which a pressure $P^*$, interpolated from pressure measurements delivered by the pressure sensors of the corresponding series S1-S5, is maximal.

The altitude z1-z5 is the altitude of the aforementioned point of the pattern, which altitude is evaluated from respective altitude data of the pressure sensors 16 of the corresponding series S1-S5.

Each stagnation-point position thus defines the position of the stagnation point of the incident airflow, in the corresponding pattern plane P1-P5, i.e., the position of the point where the incident airflow separates into two flows that move past the aerodynamic profile 12 on each side thereof.

The stagnation-point positions are referenced PT1 to PT5 in FIG. 2.

To a first approximation, the altitude data may simply consist of the respective altitudes of the pressure sensors 16 in a frame of reference that is fixed with respect to the yacht. These respective altitude data relative to the yacht are fixed preset data related to the arrangement of the sensors 16.

Preferably, the altitude data furthermore comprise a variable component determined, for each of the sensors 16, from measurements of the orientation (list, longitudinal trim) of the yacht, these measurements, for example, being delivered by gyroscopic sensors.

The stagnation-point positions are thus determined with an optimal precision.

The system furthermore comprises a memory 22 containing a map relating the stagnation-point positions respectively determined along each of the patterns M1-M5 and operational parameters of the aerodynamic profile to a direction profile of the airflow. Such a map is established beforehand from an aerodynamic model of the aerodynamic profile.

In the described example, the operational parameters of the aerodynamic profile preferably comprise the angle of rotation of the mast, and the camber angle and twist angle of the aerodynamic profile.

In the preferred embodiment of the invention, the computer 20 is furthermore configured to determine, along each of the patterns M1-M5, a respective stagnation pressure PS1, PS5, defined as the value of the pressure at the corresponding stagnation-point position.

The system furthermore comprises a reference-pressure sensor 24 placed in a sheltered zone, away from the aerodynamic profile 12. What must be understood by this is that the reference-pressure sensor 24 is positioned in a zone that is normally not subjected to the airflow. The reference-pressure sensor 24 thus allows a reference pressure $P_{ref}$ equal to the atmospheric pressure at the altitude $z_{ref}$ of the sensor 24 to be measured.

The reference-pressure sensor 24 is connected to the computer 20.

This computer 20 is furthermore configured to determine a speed profile of the airflow from the reference pressure $P_{ref}$ delivered by the reference-pressure sensor 24 and from the stagnation pressures PS1-PS5 respectively determined along each of the patterns M1-M5.

In the preferred embodiment of the invention, the determination of the speed profile is based on the application of Bernoulli's theorem, the following being considered to be true for each pattern Mi (i being comprised between 1 and 5 in the illustrated example):

the total pressure at the stagnation point is equal to the stagnation pressure PSi;

this total pressure is also equal to $P_{ref} + \rho g(z_i - z_{ref}) + \frac{1}{2}\rho v_i^2$, where:

vi is the speed of the airflow incident on the pattern Mi, zi is the altitude of the corresponding stagnation-point position, ρ is the density of air, which is considered to be constant and calculated at a reference point, g is the gravitational acceleration.

Hence the value of the corresponding speed is:

$$vi = \sqrt{\frac{2}{\rho}[PSi - P_{ref} - \rho g(zi - z_{ref})]}$$

As a variant, instead of using the reference pressure delivered by the reference sensor 24, the computer may be configured to determine a speed profile of the airflow from a reference speed delivered by an anemometer arranged close enough to one of the patterns Mj (j being, in the described example, comprised between 1 and 5) and to the leading edge for the speed of the airflow incident on the pattern Mj to be equatable to the reference speed.

The pressure within the airflow incident on the pattern Mj may then be determined by means of Bernoulli's theorem, by once again equating the total pressure at the stagnation point to the stagnation pressure PSj. The speed of the airflow incident on the other patterns may then be deduced in an analogous way to the one described above, with $P_{ref}$ and $z_{ref}$ replaced by PSj and zj.

The system may obviously combine these two techniques for determining the speed profile, i.e., reference-pressure measurement and correlation respectively, in order for example to deliver speed values obtained by averaging the results delivered by the two determining techniques.

Lastly, the sailing yacht 10 furthermore includes an automatic or assisted piloting device 26 configured to control at least one operational parameter of the aerodynamic profile on the basis of the stagnation-point positions respectively determined along each of the patterns M1-M5.

The operational parameters controlled by the device 26 preferably comprise the camber angle and the twist angle.

The operation of a sailing ship according to the invention, for example the sailing yacht 10, will now be described with reference to FIGS. 3-9.

Figure 3:
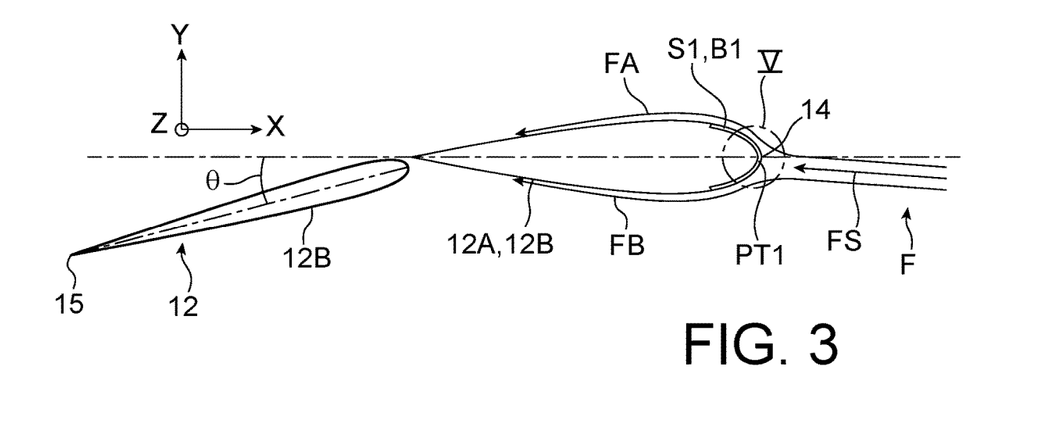
FIG. 3 is a schematic view of a cross (i.e., horizontal) section of the aerodynamic profile.

FIG. 3 shows a cross section of the aerodynamic profile 12, for example in the plane P1 of the series of sensors S1.

FIG. 3, in particular, shows an airflow F incident on the leading edge 14, the airflow becoming separated into two flows FA and FB that respectively move past the aerodynamic profile 12 on each side thereof. The flows FA and FB are separated from each other by a stagnation line FS that meets the leading edge at a corresponding stagnation point PT1. The angle of incidence of the flow F on the leading edge 14, and therefore the position of the stagnation point, is liable to vary along the leading edge 14 (i.e., as a function of altitude).

The computer 20 receives at high frequency (for example 64 Hz) the local values of the pressure P*, which respectively originate from the pressure sensors 16. The computer preferably carries out temporal filtering on these local pressure values in order to remove insignificant fluctuations.

Figure 4:
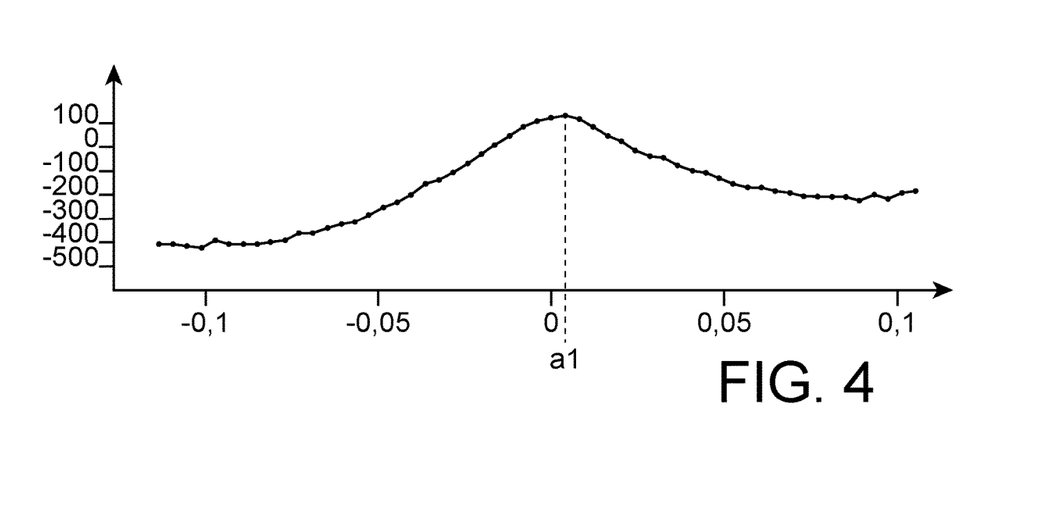
FIG. 4 is a graph showing a quantity $P^*=\rho gz+P$ (ordinate axis), as a function of the normalized curvilinear position along a pattern formed by a series of pressure sensors placed on either side of the leading edge (abscissa axis)

FIG. 4 is a graph showing, in the form of points, the local value of the pressure P* in pascals (ordinate axis) for each of the sensors 16 of one of the series, for example the series S1. The abscissa axis corresponds to the curvilinear abscissa of the sensors along the corresponding pattern M1, which abscissa has, for the sake of simplicity, been normalized by the chord of the aerodynamic profile.

For each series of sensors S1-S5, the computer carries out an interpolation of the local values of the pressure P*, resulting in the curve connecting the points of FIG. 4; then the computer determines the position of the maximum of the pressure P* on the curve, which defines the abscissa a1-a5 of the corresponding stagnation-point position.

The computer also determines the altitude z1-z5 of the corresponding stagnation-point position, preferably by interpolation of altitude data relating to the pressure sensors 16. These data are determined from the location of each of the sensors on the aerodynamic profile, which location is recorded in the memory 22, and these data are, in the preferred embodiment of the invention, refined by means of measurements of the orientation of the yacht, which are for example delivered to the computer at a lower frequency (for example 10 Hz).

Figure 5:
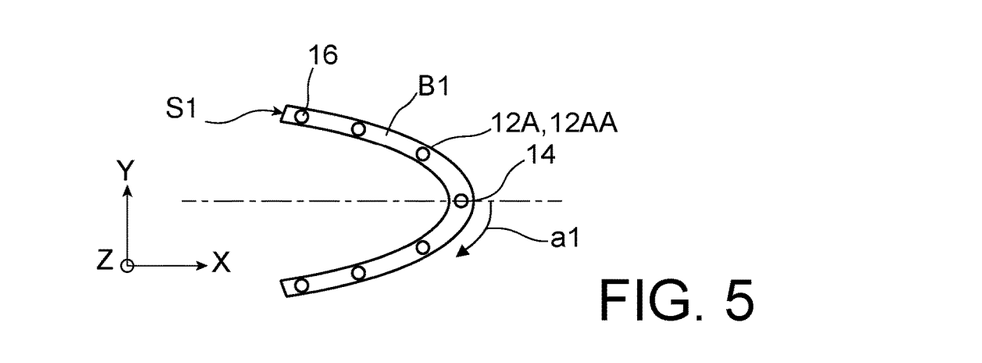
FIG. 5 is a view at larger scale of the detail V of FIG. 3, illustrating a stagnation-point position along the pattern.

FIG. 5 is a view at larger scale of the portion V of FIG. 3, in which the thickness of a strip of sensors B1 and the dimensions of each sensor 16 have been exaggerated whereas the number of sensors shown has been greatly decreased, for the sake of clarity. This figure shows the abscissa a1 of the stagnation-point position along the pattern M1, which for example substantially coincides with the position of a sensor 16.

Figure 6:
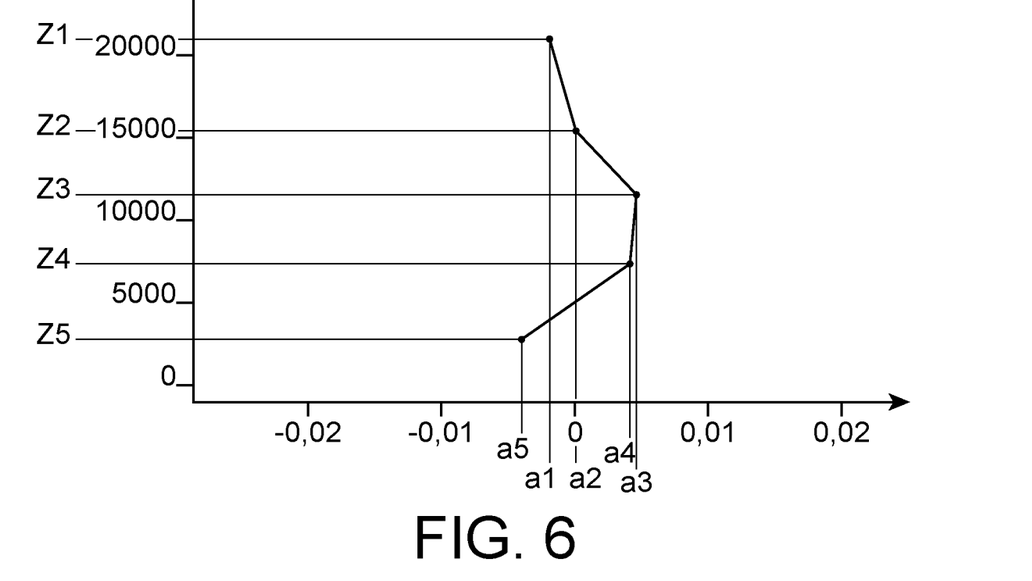
FIG. 6 is a graph showing the stagnation-point position (abscissa axis) of various heights (ordinate axis)

FIG. 6 is a graph showing the stagnation-point positions (a1; z1)-(a5; z5) respectively determined for the various series of sensors S1-S5. The abscissa axis indicates the curvilinear abscissa normalized by the chord of the aerodynamic profile, whereas the ordinate axis indicates the altitude in millimeters.

Figure 7:
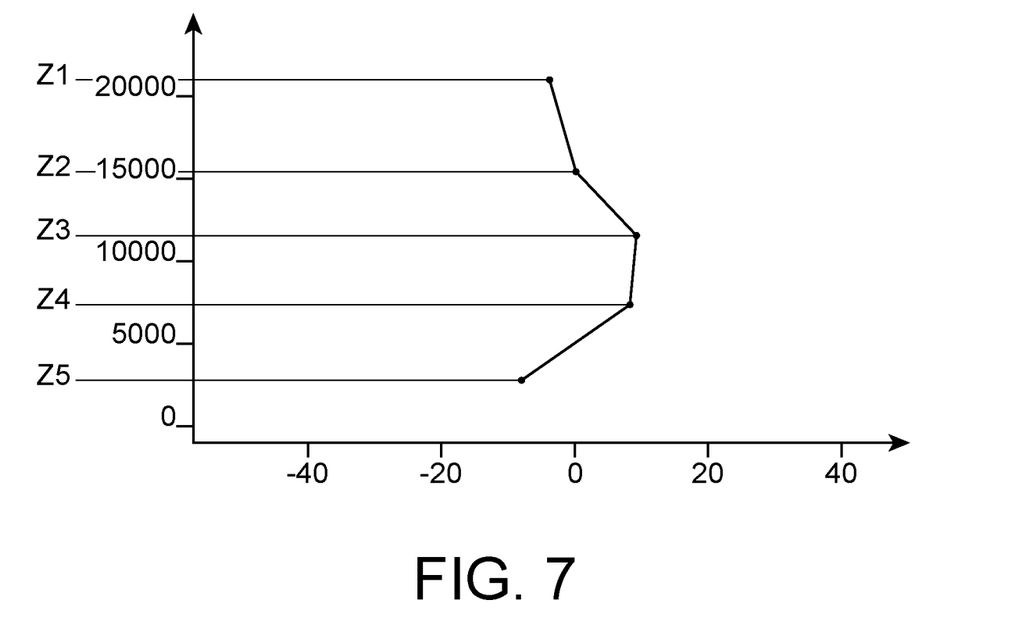
FIG. 7 is a graph showing the direction profile of the airflow along the leading edge.

From the stagnation-point positions and from the map stored in the memory 22, the computer determines a direction profile of the airflow along the leading edge 14, which is illustrated by FIG. 7, in which the abscissa axis indicates the orientation of the airflow in degrees, whereas the ordinate axis indicates the altitude in millimeters.

In addition, the computer determines, along each of the patterns M1-M5, the respective stagnation pressure PS1-PS5, which, as explained above, is defined as the value of the pressure at the corresponding stagnation-point position.

Figure 8:
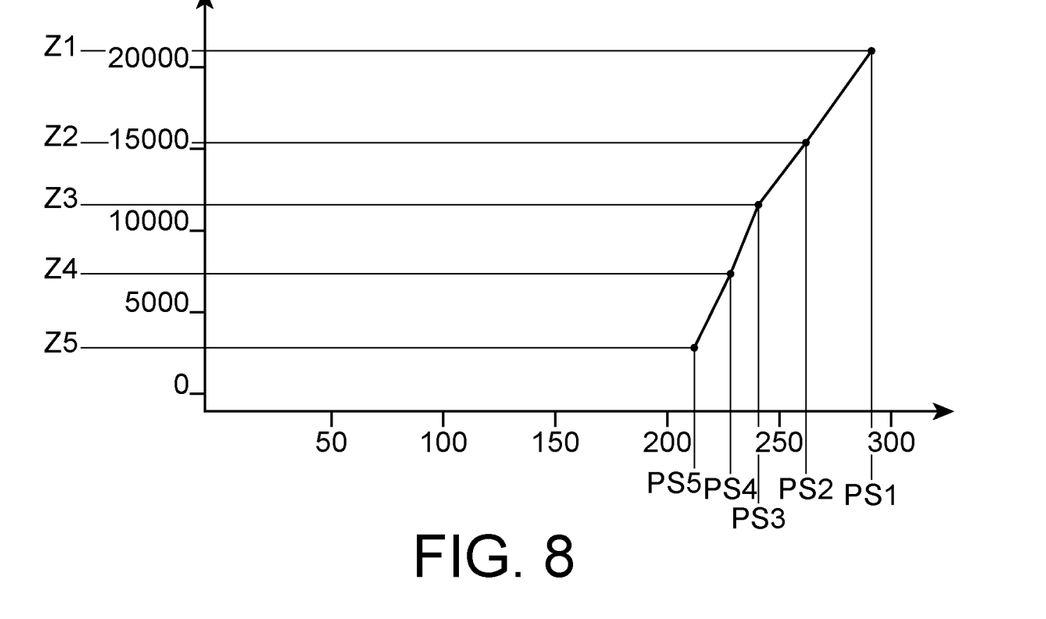
FIG. 8 is a graph showing the stagnation pressure (abscissa axis) for various heights (ordinate axis)

FIG. 8 is a graph showing the stagnation pressures PS1-PS5 in pascals (abscissa axis) respectively determined for the various series of sensors S1-S5, which are identified by the altitude of the respective stagnation-point position in millimeters (ordinate axis).

Figure 9:
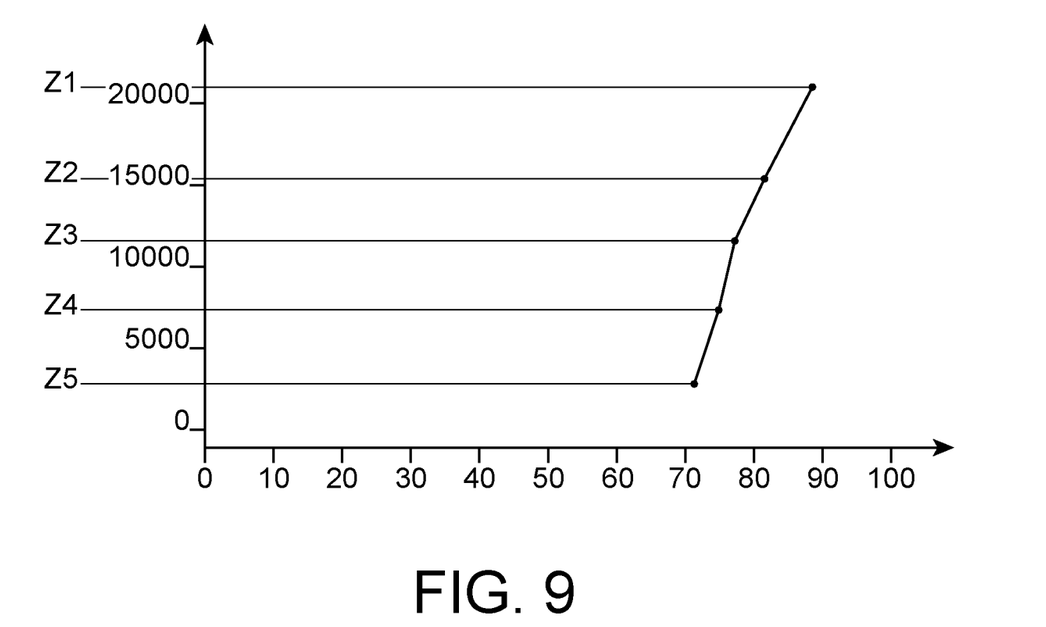
FIG. 9 is a graph showing the speed profile of the airflow along the leading edge.

The computer 20 furthermore determines a speed profile of the airflow, using at least one of the methods described above. FIG. 9 illustrates an example of a speed profile thus obtained. The abscissa axis indicates the speed in km/h, whereas the ordinate axis indicates the altitude in millimeters.

As a variant, the invention is also applicable to a flexible sail, in which case the aerodynamic profile, on which the series of pressure sensors are placed, comprises a rigid profiled mast arranged at the front end of the sail.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sailing ship comprising an aerodynamic profile forming a sail of the sailing ship, and a system for determining characteristics of an airflow incident on a leading edge of the aerodynamic profile, wherein the system comprises:
 a plurality of series of pressure sensors, wherein the pressure sensors are arranged on a surface of the aerodynamic profile, the pressure sensors of each series being distributed on either side of the leading edge of the aerodynamic profile, the series of pressure sensors virtually forming respective patterns that are spaced apart from one another, each of the patterns being a simple polygonal line; and
 a computer connected to the pressure sensors so as to receive local pressure values respectively originating from the pressure sensors;
 wherein the computer is configured to determine, along each of the patterns, a respective stagnation-point position defined by a curvilinear abscissa defined along the pattern in question and for which a pressure interpolated from pressure measurements delivered by the pressure sensors of the corresponding series is maximal along the pattern in question, and by an altitude evaluated from respective altitude data of the pressure sensors of the corresponding series; and
 wherein the respective altitude data of the pressure sensors are determined from respective altitudes of the pressure sensors in a frame of reference that is fixed with respect to the sailing ship, and from a variable component determined, for each of the pressure sensors, from measurements of an orientation of the ship.

2. The sailing ship as claimed in claim 1, wherein the patterns lie in respective pattern planes that are distinct from one another and such that each of the pattern planes is orthogonal to an osculating plane at a point of intersection of the leading edge and of the pattern plane in question.

3. The sailing ship as claimed in claim 2, wherein the pattern planes are parallel to one another.

4. The sailing ship as claimed in claim 1, wherein the system furthermore comprises a memory containing a map relating the stagnation-point positions respectively determined along each of the patterns and operational parameters of the aerodynamic profile to a direction profile of the airflow.

5. The sailing ship as claimed in claim 1, wherein the computer is furthermore configured to determine, along each of the patterns, a respective stagnation pressure, defined as a value of a pressure at the corresponding stagnation-point position.

6. The sailing ship as claimed in claim 5, wherein the system furthermore comprises a reference-pressure sensor placed in a sheltered zone away from the aerodynamic profile and connected to the computer, and wherein the computer is furthermore configured to determine a speed profile of the airflow from a reference pressure delivered by the reference-pressure sensor and from the stagnation pressures respectively determined along each of the patterns.

7. The sailing ship as claimed in claim 5, wherein the system furthermore comprises an anemometer connected to the computer, and wherein the computer is furthermore configured to determine a speed profile of the airflow by equating an airflow speed value delivered by the anemometer to a speed value of the airflow incident on one of the patterns, and from the stagnation pressures respectively determined along each of the patterns.

8. The sailing ship as claimed in claim 1, comprising an automatic or assisted piloting device configured to control at least one operational parameter of the aerodynamic profile based on the stagnation-point positions respectively determined along each of the patterns.

* * * * *